United States Patent
Goodbody et al.

(10) Patent No.: US 7,539,634 B2
(45) Date of Patent: May 26, 2009

(54) ACCOUNT RECONCILIATION SYSTEM AND METHOD

(75) Inventors: Gerald Goodbody, Castro Valley, CA (US); Lynne Rossi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 636 days.

(21) Appl. No.: 10/185,893

(22) Filed: Jun. 27, 2002

(65) Prior Publication Data
US 2007/0179870 A1    Aug. 2, 2007

(51) Int. Cl.
*G07B 17/00* (2006.01)

(52) U.S. Cl. .............................. 705/30; 705/28; 705/37; 705/39

(58) Field of Classification Search ..................... 705/30
See application file for complete search history.

(56) References Cited

U.S. PATENT DOCUMENTS

| | | | | |
|---|---|---|---|---|
| 5,093,787 | A * | 3/1992 | Simmons | 705/33 |
| 5,134,564 | A * | 7/1992 | Dunn et al. | 705/33 |
| 6,882,983 | B2 * | 4/2005 | Furphy et al. | 705/30 |
| 7,096,223 | B2 * | 8/2006 | Cope | 707/100 |
| 2002/0026416 | A1 * | 2/2002 | Provinse | 705/39 |
| 2003/0055667 | A1 * | 3/2003 | Sgambaro et al. | 705/1 |
| 2003/0216975 | A1 * | 11/2003 | Montey et al. | 705/28 |
| 2004/0054547 | A1 * | 3/2004 | Rozendaal et al. | 705/1 |

OTHER PUBLICATIONS

Anonymous, Information found on the website of CheckFree, Apr. 17, 2000, pp. 11.*
Anonymous, Information found on the website of CheckFree, Apr. 17, 2000, pp. 11.*
Ford et al., "Pattern matching techniques for correcting low confidence OCR words in a known context," Feb. 13, 2002, pp. 12, http://archive.nlm.nih.gov/pubs/ford/spie01/spie01exab.php.*

* cited by examiner

*Primary Examiner*—F. Zeender
*Assistant Examiner*—Asfand M Sheikh
(74) *Attorney, Agent, or Firm*—Townsend and Townsend and Crew LLP

(57) ABSTRACT

Systems, methods and user interfaces that facilitate the reconciliation process in computerized accounting systems are provided. An advantageous feature of aspects of the account reconciliation systems and method provide that two types of entries are grouped together and their sums compared to determine if grouped entries are balanced. In addition, user interfaces that allow users to understand what entries are out of balance and to obtain further information regarding those entries can also be combined with the systems and methods to expedite the process of explaining out of balance entries.

25 Claims, 8 Drawing Sheets

Home > Manage Costs > Reconcile Inventory > Inquire > IMAP Details

BU Recv: US001 Receiver ID: LLR-R4 Line: 1 Seq: 1 Mem ID: FR7002

New Window

Detail

☐ Discrepancy Accepted

Inventory Accrued Liability

| Transaction | Account | | | | | | |
|---|---|---|---|---|---|---|---|
| # Unt | Seq # | Group | Acct Ln No | Acct Date | Date/Time | Cost Elmnt | Description | Amount | Detail |
| US008 | 1 | 400 | 18622 | 01/30/2001 | 01/30/2001 5:25:04:56:0000PM | 104 | Material-Frames | -1045.31 | Detail |
| US008 | 1 | 400 | 18638 | 01/30/2001 | 01/30/2001 5:25:04:56:0000PM | 600 | Freight | -280.00 | Detail |
| US008 | 1 | 400 | 18662 | 01/30/2001 | 01/30/2001 5:25:04:56:0000PM | 603 | Miscellaneous | -60.00 | Detail |

First ◁ 1-3 of 3 ▷ Last

Vouchers

| Voucher | Line | Dist | Vendor | Home | Merchandise | Sales Tax | Freight | Use Tax | Miscellaneous | Amount | Detail |
|---|---|---|---|---|---|---|---|---|---|---|---|
| LLR-V4 | 1 | 1 | SCM0000001 | BIKE SHOP | 1050.00 | | | | 120.00 | 1170.00 | Detail |
| LLR-V4A | 1 | 1 | SCM0000001 | BIKE SHOP | 1050.00 | | | | 120.00 | 1170.00 | Detail |
| LLR-VTA | 1 | 1 | SCM0000001 | BIKE SHOP | | | 192.79 | | | 192.79 | Detail |

First ◁ 1-3 of 3 ▷ Last

Return to Search | Next in List | Previous in List

FIG. 6

Home > Manage Costs > Reconcile Inventory > Inquire > Inventory Transaction Entries    New Window Transaction Entries

| Unit: | Item: | Item Group: | Dist Type: |
|---|---|---|---|
| US008 | FR7002 | | |
| | Sequence Number: | Accounting Date: | Dt Timestamp: |
| | 1 | 1/30/2001 | 1/30/01 5:25:04:560000PM |

Accounting Entries resulting from the Transaction        Find | View All    First ▽ 1-6 of 6 △ Last Chart Fields | Details |▭▽|

| Acct Ln No | Debit Amount | Credit Amount | | Group | Cost Elmnt | Account | Alternate Account | Operating Unit | Department | Product | Project ID |
|---|---|---|---|---|---|---|---|---|---|---|---|
| 18621 | 1,045.310 | 710 | USD | 400 | 104 | 513000 | | | | | |
| 18622 | | 1,045.310 | USD | 400 | 104 | 212000 | | | | 13000 | |
| 18637 | 280.000 | | USD | 400 | 600 | 513000 | | | | | |
| 18638 | | 280.000 | USD | 400 | 600 | 212000 | | | | 13000 | |
| 18661 | 60.000 | | USD | 400 | 603 | 513000 | | | | | |
| 18662 | | 60.000 | USD | 400 | 603 | 212000 | | | | 13000 | |

FIG. 7

ACCOUNT RECONCILIATION SYSTEM AND METHOD

BACKGROUND

1. Technical Field

The present application relates generally to computerized accounting systems and methods, and amongst other things to account reconciliation systems and methods in computerized accounting systems.

2. Background

One of the more important tasks in the modem accounting process is the preparation of periodic financial statements. These financial statements are subject to audits and review by management, which both require an explanation of any out of balance conditions for any accounts and the specific entries that caused the out of balance conditions. In order to reconcile or explain the reasons for the account being out of balance the specific entries that were not balanced have to be identified. The determination of the specific entries that are out of balance requires manual intervention. Specifically, the users of the accounting system have to manually go through each entry and determine whether it is balanced. This laborious and time-consuming process does not provide any further information as to the reasons why the entry is not balanced, but only identifies the entries that are not balanced.

Purchasing accounts, such as those related to inventory accounts, are often out of balance in a given accounting period and therefore require reconciliation or an explanation as to why they are out of balance. Generally, the purchasing process begins with the creation of a purchase order that is sent to a vendor. The vendor then ships some or all of the goods ordered with a shipping manifest. The goods are received and the individual lines of the shipping manifest are entered into the computerized accounting system, where they are stored as different entries of a receipt. The entries of the receipt include, but are not limited to, goods related information such as the items shipped, cost, and quantity, as well as other non-goods related cost charges such as taxes, freight, duty, and overhead. The receipt entries generally are credited to clearing account and debited to an inventory account.

Some time after receipt of the goods, although sometimes along with their shipment, one or more invoices are received from one or more vendors. An invoice is a bill for goods related costs and non-goods related costs. The invoice is vouchered and input into the computerized accounting system. The voucher, which is the input invoice, also consists of multiple line-level entries each related to the goods and non-good related costs. The voucher entries are generally debited to the clearing account and credited to an accounts payable account.

For entries related to both receipts and vouchers the information includes a number of identifiers including, for example, the business unit making the purchase, the vendor, item information and identification, accounting code, quantity, description and the cost.

At the end of a time period, for example a month or quarter, a financial statement is prepared. In these financial statements, the clearing account should have a zero balance, i.e. debits equal credits. Often the clearing account does not balance and the accounting personnel are left with the task of reconciling the account and, if need be, determining the reason for the out of balance condition after attempts at reconciliation. The problem becomes more difficult to manage as the size of an organization increases, since the number of entries in the clearing account can easily number in the many thousands. The need to determine the reason for the out of balance conditions can require a great deal of time, if done manually, by the accounting personnel if using tick and tie approach. Moreover, the manual approach is prone to error and unexplained differences that often result in substantial write-offs and other adjustments to the organizations financial statement.

In some cases, the out of balance condition can result from the issuance of an invoice in a different accounting period than the receipt of the goods purchased. However, without knowing this information in advance, there still exists the need to find those receipt entries that do not balance and either reconcile them or be able to know that the related invoice has yet to be received. Other reasons that accounts could be out of balance include that either receipt or voucher was incorrectly entered, receipts were not entered, the receipt or voucher was entered in an incorrect account, the accounting system failed to enter the receipt into the general ledger account, and certain non-goods costs such as duties or freight are invoiced separately from the goods.

A further problem is that individual receipts may not, on a line-by-line basis, match individual vouchers. This often happens if more than one invoice is used by a vendor for single purchase order. This problem is common where orders of goods are shipped at different times. The reverse situation, multiple receipts for a single voucher, happens when a vendor bills at regular intervals, regardless of the number of purchase orders issued during the interval.

Therefore, there exists a need for efficient automation of the account reconciliation process, the determination as to which entries are not balanced, and for facilitating the explanation of the entries that are not balanced.

SUMMARY

Systems and methods are provided that facilitate the account reconciliation and the determination as to the explanation as to why entries are unreconciled.

In one embodiment, a method and of facilitating reconciliation of entries in a computerized accounting system is provided. The method comprises comparing a plurality of first entry types with a plurality of second entry types to determine whether a match exists and for each of the one or more first entry types that match one or more second entry types, determining whether their sums are equal.

In another embodiment, a method of account reconciliation in a computerized accounting system is provided. The method comprises determining which of a plurality of first entry types are related; comparing the related first entry types with a plurality of second entry types to determine whether a matches exists, and creating at least one set comprising the related first entry types and a matched at least one second entry type.

In a further embodiment, a computerized accounting system is provided. The method comprises a memory that stores a plurality of first entry types and a plurality of second entry types and a processor. The processor compares at least some of the plurality of first entry types with at least some of the second entry types to determine whether a match exists and that determines whether a sum of one or more first entry types that match one or more second entry types are equal to a sum of the one or more second entry types.

In additional embodiments, the methods and systems described are implemented in computer readable media that contain instructions for a computer to perform the methods and the functions of the systems.

BRIEF DESCRIPTION OF THE DRAWINGS

FIG. 6 is a block diagram of a user interface for unreconciled entry presentment in a preferred account reconciliation system;

FIG. 7 is a block diagram of a user interface showing greater detail of an unreconciled entry of a preferred account reconciliation system.

DETAILED DESCRIPTION

The systems, methods and user interfaces described herein provide automated account reconciliation functionality. The automated account reconciliation functionality also provides the ability to determine which entries may correspond to facilitate further user directed reconciliation for entries that are not balanced. It is preferred, although not required, that matching entries of two types be grouped together and their sums compared to determine if the groups of entries are balanced. Further, automated reconciliation functionality can be combined with user interfaces that allow an easy system for users to understand what entries are out of balance and to obtain further information regarding those entries to facilitate account reconciliation and out-of-balance explanation.

Figure 1:
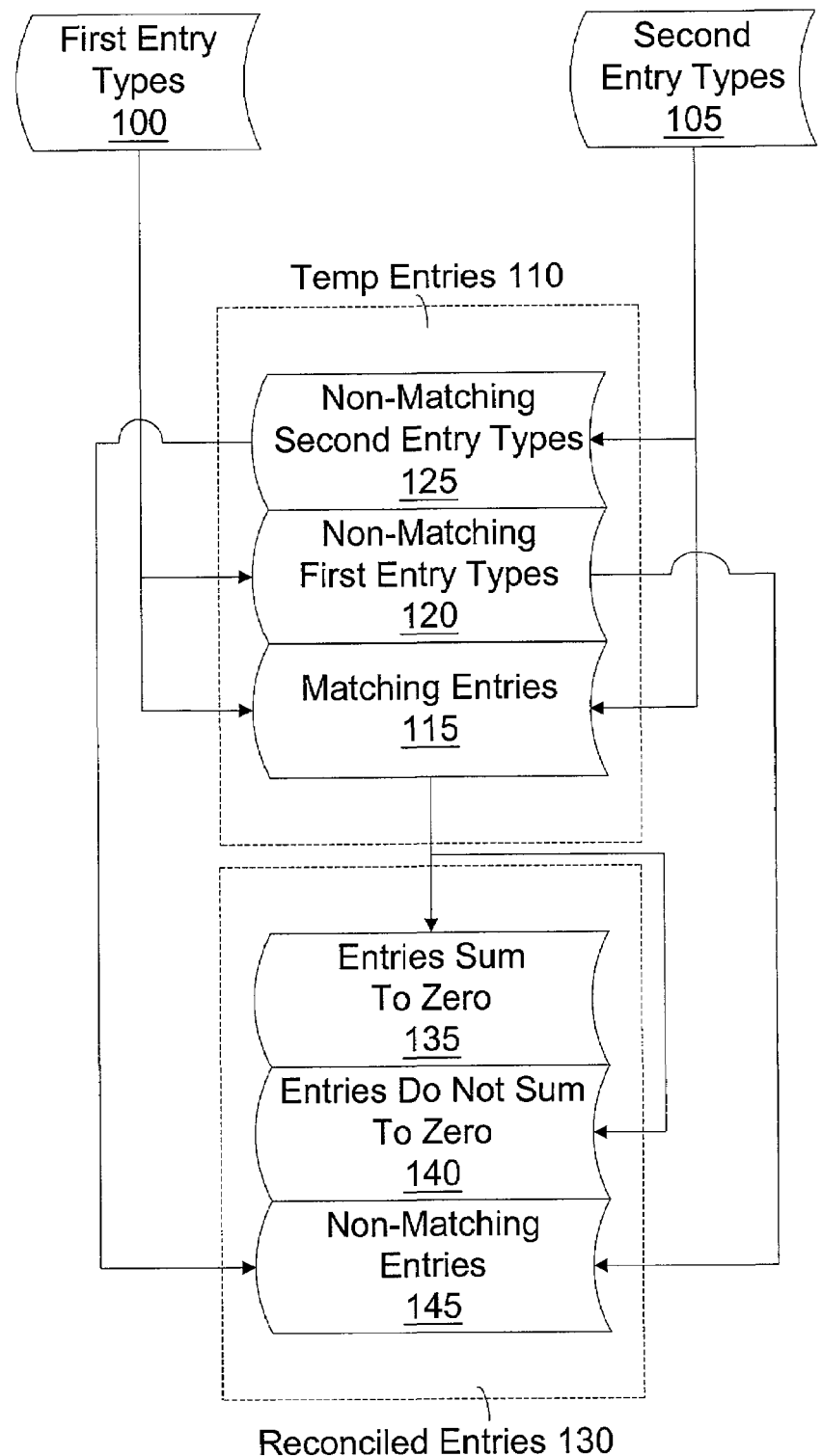
FIG. 1 is a block diagram of data structures for a preferred account reconciliation system.

Referring to FIG. 1, a block diagram of data structures for a preferred account reconciliation system is depicted. First entry types 100, positive value debits, and second entry types 105, negative value credit, include all of the first and second entry types, respectively, that should balance, net to zero. The entries may be from any account type, although in most cases they will be from a single account, e.g. a clearing account which is an account that receives entries from at least two other accounts and that is expected to sum to zero at some point in time. Further, the entries need not be all of the entry types that are part of a given account, for example, if a general ledger account is being reconciled the entries that are being reconciled may be the receipt and voucher entries for a specific clearing account or the receipt and voucher entries for a specific department of a business unit's accrued liability clearing account related to that business unit. Where the entries are receipt entries and voucher entries, it is preferred that the receipt entries are entered according to the categorization of goods and non-goods that exist in the accounting system. However, the voucher entries can be entered in any way, and are often entered as a single amount for the entire invoice or based upon the actual lines of the invoice.

It is preferred, that an entry is the user input information related to a line of a purchase order, receipt or voucher, regardless of whether all of the information is stored as a single string, multiple strings with links or pointers, or metadata related to an entry.

Although depicted as being contained in separate data files, first entry types 100 and second entry types 105 may be both contained in a single data file, such as a file containing the entries in the general ledger, or be multiple data files that contain one or both types of data. All that is required is that both sets, the first entry types 100 and second entry types 105 be organized in some order, preferably stratified based upon the attributes or keys that are used to match the first entry types 100 and the second entry types 105, so that they can be used to create the temporary entry table 110. The temporary entry table 110 includes matching entries 115, where the first entry types 100 match second entry types 105 with the matched entries being identified. It is also preferred that the first entry types 100 are summed into matching sets based upon a relationship to a sum of the second entries. The relationship of the sum first entries to a sum of the second entry that match can be based upon, for example, whether they relate to a same purchase order or receipt.

The temporary entry table 110 also includes the non-matching first entry types 120, i.e. first entry types 100 without matched second entry types 105, and non-matching second entry types 125, i.e. second entry types 105 without matched first entry types 100.

While FIG. 1 depicts a file with both non-matching first entry types 120 and non-matching second entry types 125, the present system and method can operate by tracking only one of the non-matching entry types, i.e. non-matching first entry types 100 or non-matching second entry types 105. It is preferred, if only one entry type is to be tracked, that the entry type tracked be first entry types 100.

Referring again to FIG. 1, a reconciled entry table 130 is divided into sets of matching entries 115 that sum to zero 135, sets of matching entries 115 entries that do not sum to zero 140, and non-matching entries 145. The sets of entries that sum to zero 135 are those sets of entries for which the sum of the first entry types 100 and the second entry types 105 are equal. The sets of entries that do not sum to zero 140 are those sets of entries for which the sum of the matching first entry types 100 and second entry types 115 are not equal. The non-matching entries 145 are those entries that do not have a matching entry of the other type, i.e. first entry types 100 not matched to a second entry type 105 and second entry types 105 not matched to a first entry type 100.

Although FIG. 1 depicts the temporary entry table 110 as containing matching entries 115, non-matching first entry types 120, and non-matching second entry types 125, it can be divided into a number of smaller tables. For example, temporary table 110 can comprise three separate tables, each for one of the matching entries 115, non-matching first entry types 120, and non-matching second entry types 125. Alternatively, the temporary table 110 can comprise two separate tables with one of the tables containing the matching entries 115 and the other containing both non-matching first entry types 120 and non-matching second entry types 125. Additionally, temporary table 110 can be divided into a number of different tables based upon dates, departments, cost elements, accounting codes or other criteria. In addition, reconciled entry table 130 can consist of one or more separate tables based upon essentially the same criteria as described with respect to the temporary table 110.

Figure 2:
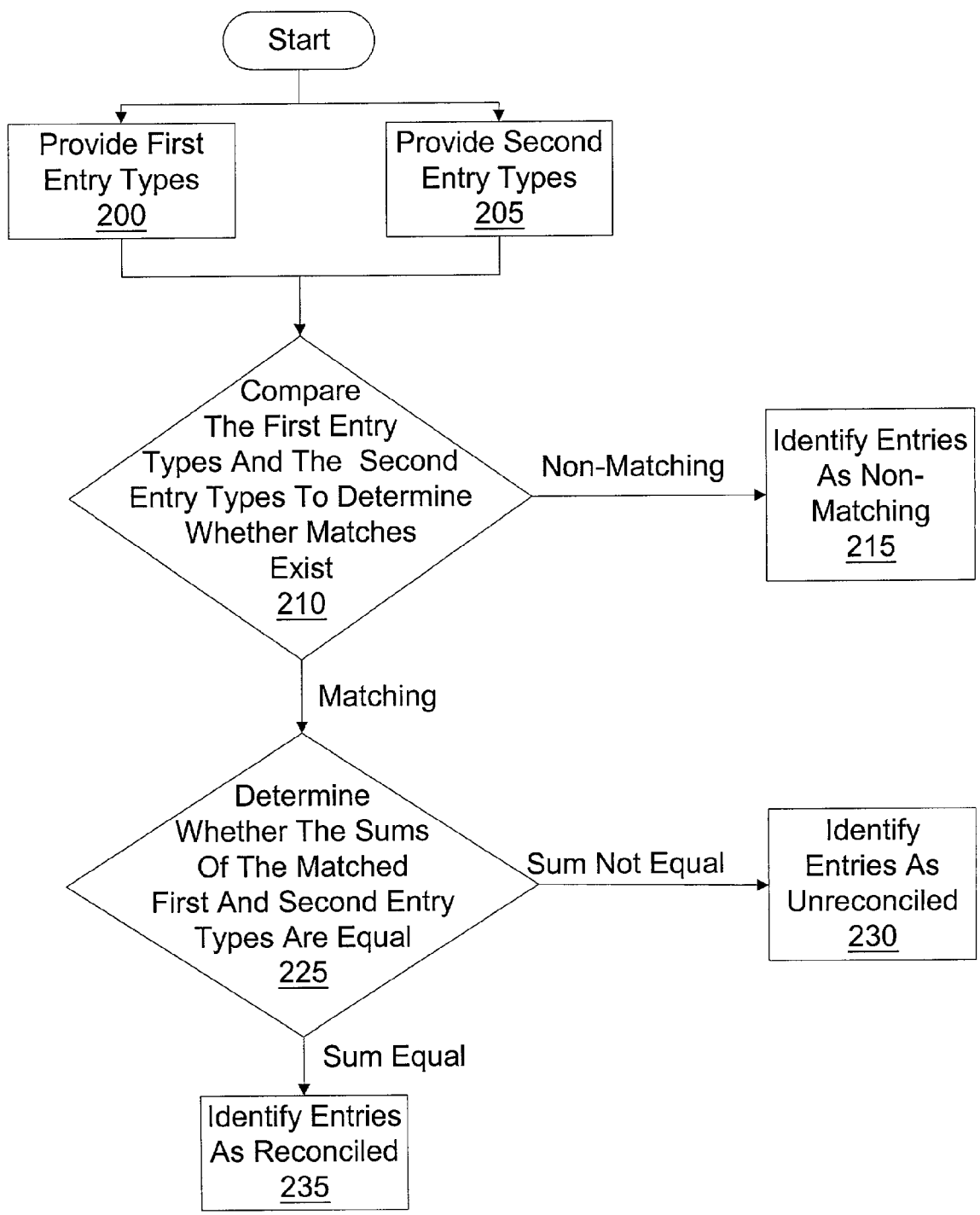
FIG. 2 is a flow chart exemplifying a preferred account reconciliation process.

Referring to FIG. 2, a flow chart exemplifying a preferred account reconciliation process is shown. First entry types 100 for the account are provided, block 200. After or simultaneously with the first entry types 100, second entry types 105 are provided, block 205. The first entry types 100 and second entry types 105 provided preferably are limited to those first entry types 100 and second entry types 105 during a time-period that is either user defined or an accounting period, e.g. a month, fiscal quarter, fiscal year.

A determination is made as to which of the first entry types 100 match which of the second entry types 105, block 210. It is preferred that matching of the entries is made based upon one or more attributes, e.g. by using keys such as the business unit, receiver identification, receiver number, and receiver shipping sequence identification, where receipt and voucher entries are being reconciled. However, the attributes used for matching can vary depending on the types of entries used. For example, a simple attribute can be a purchase order identifier to which the entry relates, where a subsequent invoice for the goods is identifies a purchase order identifier. Matching entries may have one to one correspondence, a many to one correspondence, or a one to many correspondence depending upon how the entries are entered and the attributes or keys that are used to match. The entries that are not matched, the non-matching first entry types 120 and/or non-matching second entry types 125, are identified as being non-matched entries, block 215.

After the first entry types 100 and second entry types 105 are matched, a determination is made as to whether the sums of the matching entries are equal, block 225. Those matching entries 115 that have equal sums are identified as being reconciled, block 235, while those with sums that are not equal are identified as being unreconciled, block 230.

The advantage of identifying the status of the entries as being non-matched, reconciled, and unreconciled, is that this information can then be provided to the user. By providing the status information of the entries to the user in these categories, the time and effort required to obtain an explanation of the unreconciled and non-matched entries can be reduced. For example, non-matched entries are more likely to have been entered incorrectly themselves or have had an incorrectly entered counterpart, or not have been invoiced during the current period than to be of another type of error. Therefore, the user of the accounting system can search for the more likely cause for the entry being unreconciled.

Although, FIG. 2 depicts determining whether the sums of the matching entries are equal, block 225, the method described can cease operation by simply identifying which of the first entry types 100 do not have at least one matching second entry type, block 215, and identifying the matching first entry types 100 and second entry types 105. Further, it is possible that those first entry types 100 that have been matched to one or more second entry types 105 are associated with the matched second entry types 105 for output to users without the remaining functions.

Figure 3:
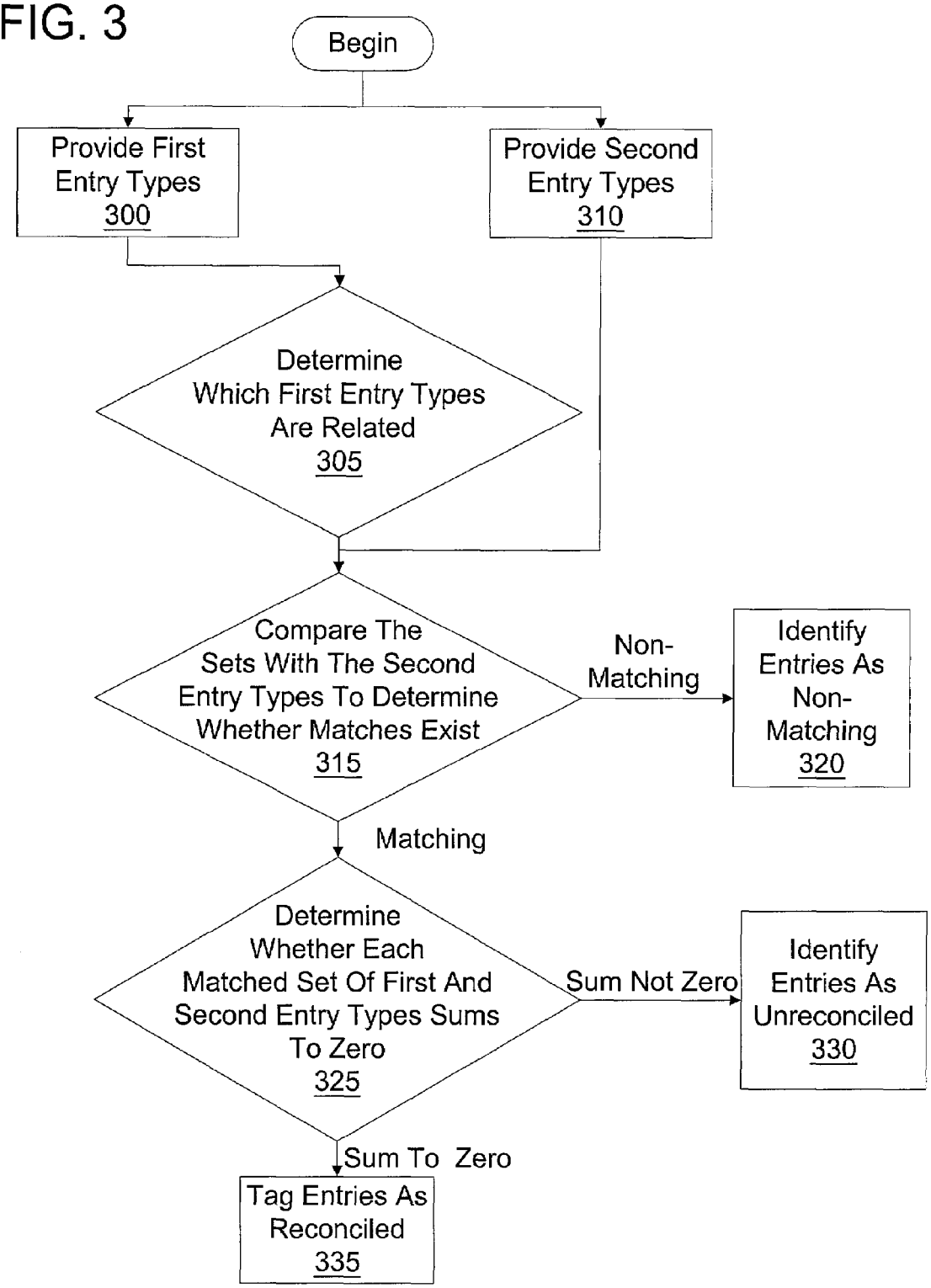
FIG. 3 is a flow chart exemplifying another account reconciliation process.

Referring to FIG. 3, a flow chart exemplifying another account reconciliation process is provided. First entry types 100 are provided, block 300. It is then determined which of the first entry types 100 are related, block 305. First entry types 100 are related if certain attributes of the first entry types 100 are the same or match certain predetermined criteria. The attributes can range from the purchase order identifier to any other desired set of information that makes up the first entry types 100, e.g. the business unit, receiver identification, receiver number, and receiver shipping sequence identification where the first and second entries are receipt and voucher entries.

First entry types 100 that are determined to be, related, block 305, are stored as sets. Second entry types 105 are then provided, block 310, and matched to the sets of first entry types 100, block 315. Matching of second entry types 105 to the sets is preferably based upon the same attributes or keys as those used to determine which of the first entry types 100 are related. However, different attributes, e.g. a group of attributes including the attributes used to determine which first entry types 100 are related plus additional attributes can be used to match the sets of first entry types 100 to the second entry types 105. Those sets that do not have a matching second entry type are identified as non-matching sets, block 320. This approach is especially useful for clearing accounts where, by storing the non-matching sets of related first entry types 100, the ability to determine which receipts were only partially or not invoiced at all during the period can be enhanced. This greatly simplifies the process of determining an explanation for any out of balance condition for an account.

A determination is made as to whether a sum of the matched second entry types 105 is equal to a sum of the first entry types 100 for each set, block 325. Those sets where the sum of the first entry types 100 does not equal the sum of the second entry types 105 are identified, along with the matching second entry types 105, as unreconciled sets, block 330. Similarly, those entries where the sum of the first entry types 100 equals the sum of the second entry types 105 are identified as reconciled sets, block 335.

As with FIG. 2, the first entry types 100 and second entry types 105 provided preferably are limited to those first entry types 100 and second entry types 105 during a time-period that is either user defined or an accounting period.

The functionality of FIG. 3 can be limited to those functions described with respect to blocks 300, 305, 310 and 315, without the functionality of the remaining blocks. In this approach, the sets of related first entry types 100 and their matching second entry types 105 need not be summed, but can be identified as being matching or non-matching in order to perform other types of processing or to determine which what specific events, i.e. those that give rise to the first and second entry types have occurred. For example, if the first entry types 100 are receipts and the second entry types 105 are vouchers, then the system can determine which receipts do not have corresponding invoices, without summing matching receipt and voucher entries.

Further, with respect to FIGS. 2 and 3, for subsequent reconciliation operations it is preferred that the entries that were identified as being reconciled are not processed again. Also, it is preferred that the entries and sets that are identified as being non-matched or unreconciled are linked to further information regarding those entries to allow a user, when those entries are displayed, to get further information on the entries to expedite the explanation process. The further information can include, but is not limited to, the accounting line of the entry, the amount of the entry, the group or business unit associated with the entry, the date of the entry, the persons associated with the activity related to the entry and the like.

Figure 4:
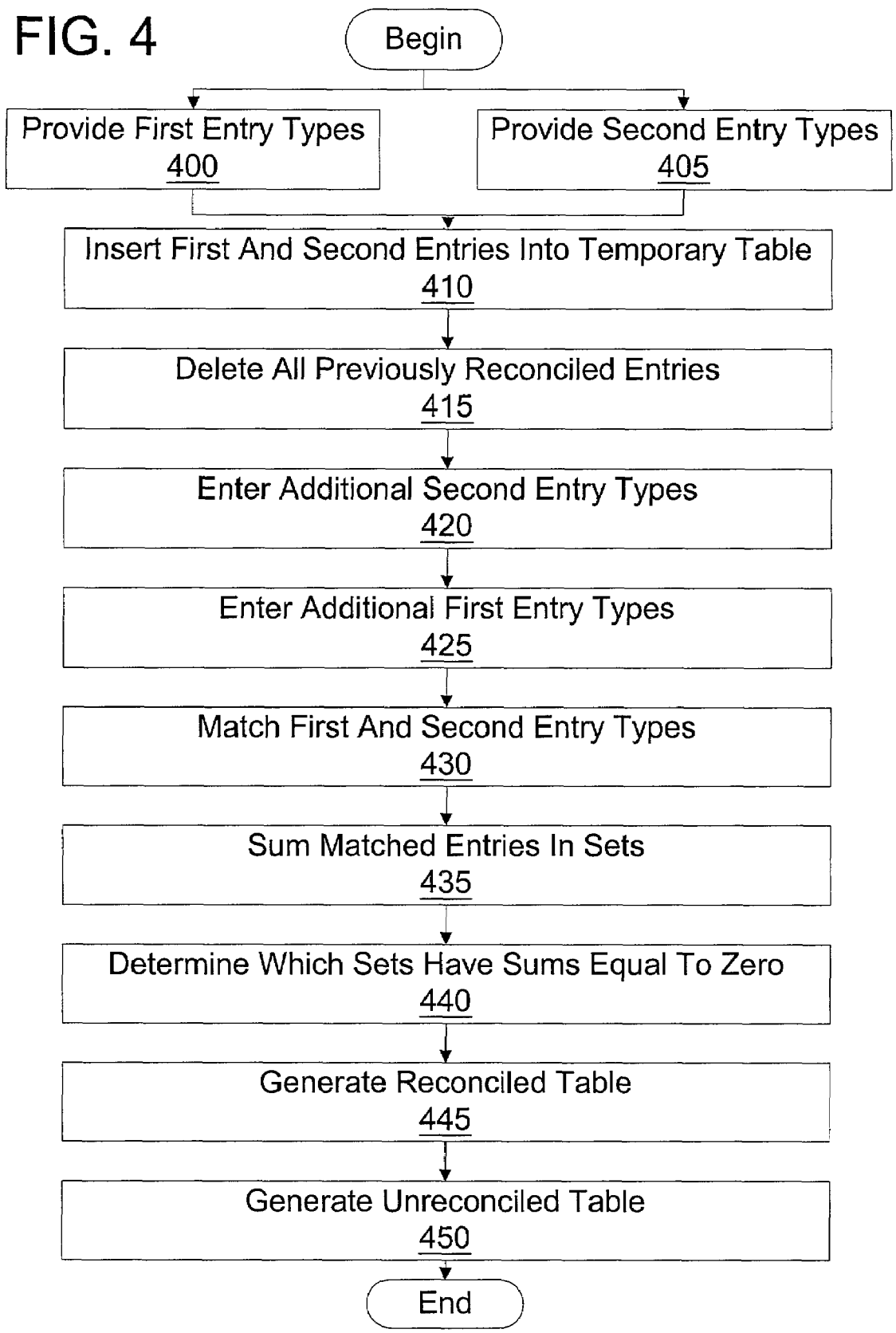
FIG. 4 is a flow chart exemplifying an account reconciliation process used in a relational database system.

Referring to FIG. 4, a flow chart exemplifying an account reconciliation process used in a relational database system is depicted. The first entry types 100 are provided from an inventory accounting line table for the appropriate time-period, block 400, second entry types 105 are provided from the accounts payable accounting line table and or the voucher table where there is a relationship match with entry types 100, block 405. Those entries are inserted into a temporary table 110, block 410. The system then deletes all those entries from the temporary table 110 that already have been reconciled, block 415. The previously reconciled entries are preferably deleted by comparing them to entries in a table that contains all of the entries of both types that have been reconciled.

Any second entry types 105 that have been posted to the clearing account being reconciled but not found in the temporary table 110 are added from the voucher accounting line table, block 420. The second entry table, e.g. a voucher table, contains all of the second entry types 105 for a group of accounts, e.g. all of the accounts for the business unit, all of the accounts for the general ledger, etc. The use of a second entry table allows second entry types 105 posted to the wrong account, but having keys that match and second entry types 105 that do not have matching first entry types 100 to be utilized in the account reconciliation process. The second entry table also preferably contains the related second entry types 105, i.e. those with some matching keys which are preferable the same keys as used to match the first entry types 100 and second entry types 105, in order together to make the matching process more efficient.

Then, first entry types 100 that are related to the second entry types, which were not found in the temporary table 110, are added to the temporary table 110, block 425. The identification of these types of entries can be performed by searching for entries having matching keys in the voucher accounting line e.g. the voucher has been posted to the account being reconciled but the receipt has not.

The first entry types 100 and the second entry types 105 in the temporary table 110 are then matched according to the appropriate keys, block 430. The comparison process groups matching first entry types 100 and second entry types 105 into sets. When the first entries are receipt entries and the second entries are vouchers, the preferred keys are business unit, receiver identification, receiver number, and receiver shipping sequence identification. At this point the temporary table 110 contains the first entry types 100 posted to the general ledger, second entry types 105 matched to the first entry types 100, and second entry types 105 that do not have matching receipts.

The sets of first entry types 100 and second entry types 105 that are matched for each set are summed separately, block 430. It is then determined whether the sum of the matched first entry types 100 and second entry types 105 are equal for each set, block 440. Those matched sets of entries where the sum of the first entry types 100 and the second entry types 105 are equal to zero, debits equals credits, are stored in a reconciled table, block 445. The matched sets of entries where the sum of the first entry types 100 and the second entry types 105 are not equal to zero are stored in an unreconciled table, block 450.

Figure 5:
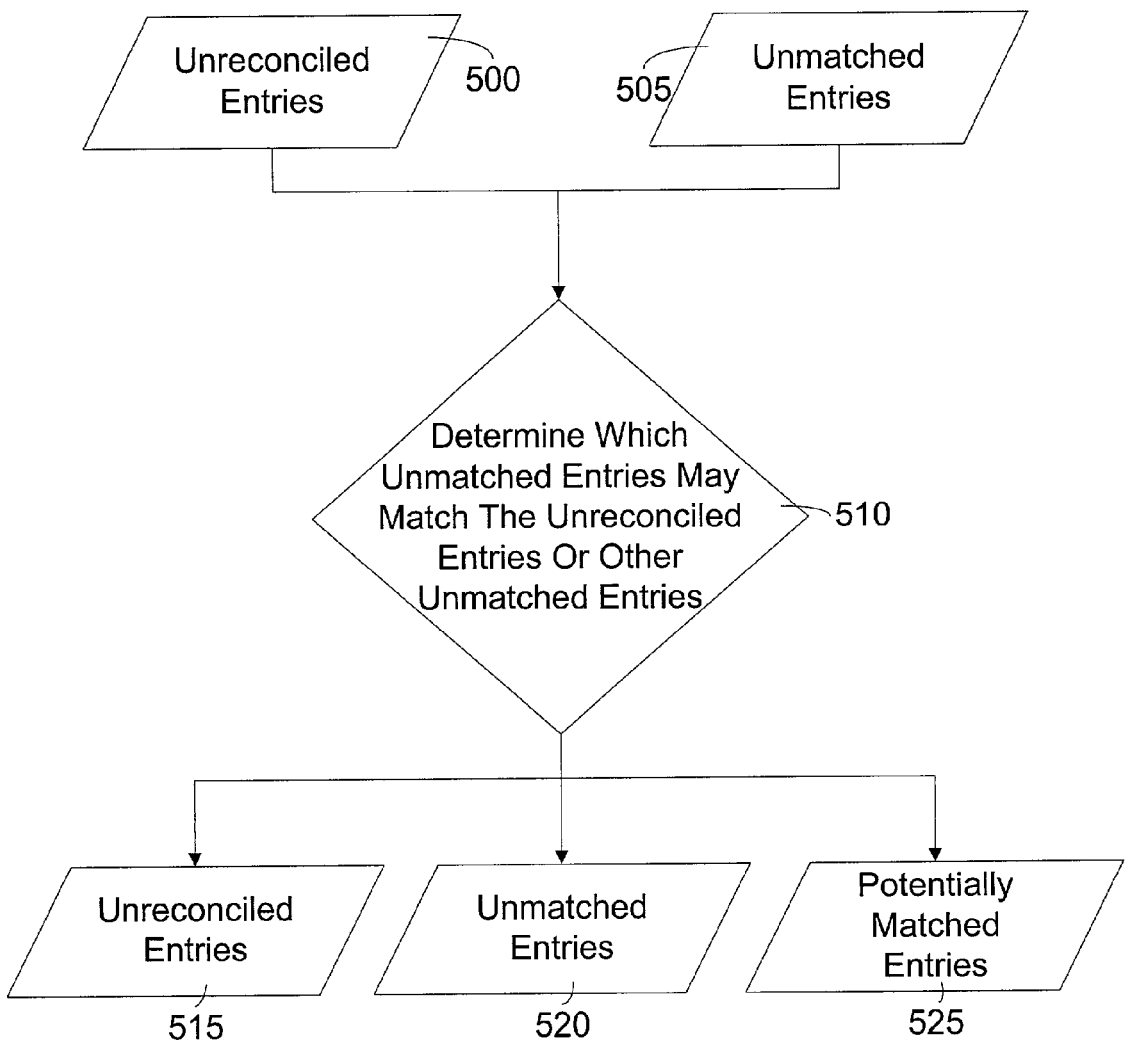
FIG. 5 is a flow chart exemplifying the user investigation process for unreconciled entry processing to explain and justify out of balance conditions and to improve the account reconciliation process.

Referring to FIG. 5, a flow chart exemplifying unreconciled entry processing to improve the account reconciliation process is depicted. Entries or sets that were non-matched or unreconciled based upon the process of FIGS. 2, 3 and 4, are provided or read from a table, blocks 500 and 505. It is then determined, if the non-matched entries may correspond, based upon an additional comparison, to any of the unreconciled sets or entries, block 510. The additional comparison is preferably comprises determining if the amount of the non-matched entries, either for the first entry types 100 and second entry types 105, is equal to a difference of the sums of the matched first and second entries. Those non-matched entries 145 that may correspond to unreconciled entries are then identified as also matching the unreconciled entries, block 515. Those entries that remain unreconciled and non-matched are then provided as such, blocks 520 and 525. The entries that may match, can then be provided for display along with the entries that are not matched or unreconciled to which they relate.

It should be noted that the functions of the blocks depicted in FIGS. 2, 3, 4 and 5 can be embodied as one or more sets of computer readable instructions that are stored on computer readable media. The instructions can be accessed from local disks or over local or wide area networks. The instructions can be located on different computers or on different media, so long as the instructions for each specific block can be called from the appropriate other instructions of that block. The instructions are then utilized to operate one or more processors to perform the instructed functions.

Referring to FIG. 6, a block diagram of a user interface for unreconciled entry presentment in a preferred account reconciliation system is depicted. A set of first entry types 600, depicted as receipt entries, with matching second entry types 605, depicted as voucher entries, whose sums of the first entry types 610 and the second entry types 615 are not equal are displayed. The related first entry types 600 include a number of related first entry types 610, while the matching second entry types 605 include the second entry types 615 that were matched to the first entry types. Each of the first entry types 610 and second entry types 615 include an associated details link 625, which is preferably displayed as a button, that allow the user to link to a view of the details of the individual entries, which provides the user further information helpful in determining an explanation for the unbalanced condition. The discrepancy accepted interface 620, which is preferably displayed as a check box, allows users to prevent further viewing of a set of unreconciled entries and, or in lieu of, to identify that entry as being explainable even though it is unreconciled. Providing for manual acceptance of unreconciled entries is especially useful for entries that are unbalanced due to an invoice that will arrive, and therefore be vouchered, in a different accounting period.

It should be noted with respect to FIG. 6 that the related first entry types 600 can be displayed without the matching second entry types 605. Alternatively, the matching second entry types 605 can be displayed without the matching first entry types 600. In addition, the related first entry types 600 and the matching second entry types 605 can be displayed as a summary of all the first entry types 610 and second entry types 615. Further, it is preferred that the user interface is a HTML created interface that is displayed in a web browser.

Referring to FIG. 7, a block diagram of a user interface showing greater detail of an unreconciled entry of a preferred account reconciliation system is shown. The detailed entry 700 preferably includes each of the account line numbers 705 where the entries were posted, along with the amount of the debit 710 or credit amount 715 of the entry. The group 720, cost element 725, and the account number 730 are also preferably provided. Further, the department code 735 of the department that is responsible for the transaction underlying the entry is also provided. Further, it is preferred that a link back to the transaction, i.e. the matched first entry types and second entry types depicted in FIG. 6, is provided.

Figure 8:
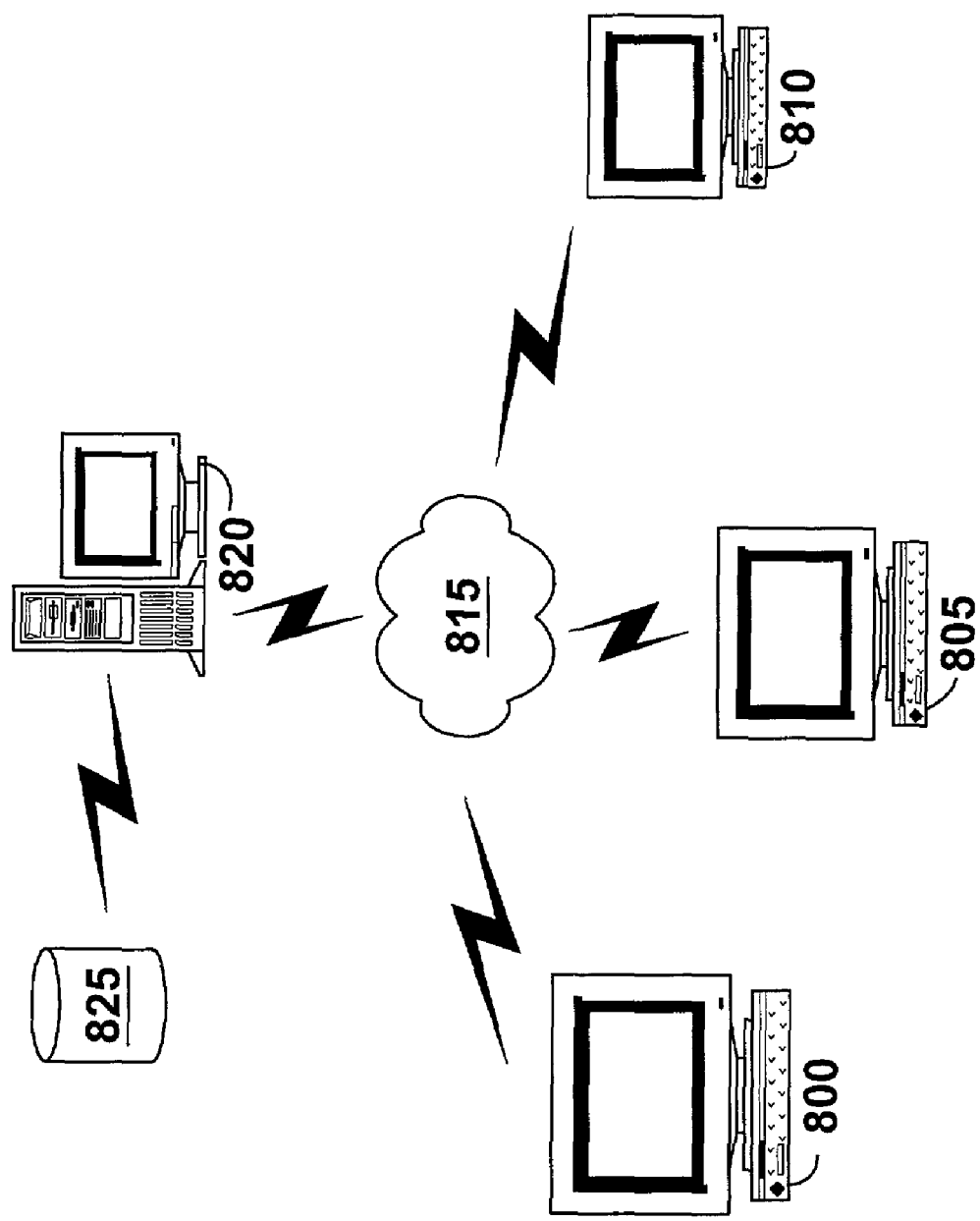
FIG. 8 is a block diagram of a preferred computer network for use with account reconciliation systems and methods described herein.

Referring to FIG. 8, a block diagram exemplifying a computer system that can be used with the systems and methods described herein is depicted. A plurality of computers 800, 805 and 810 are coupled through network 815 to server 820. Computers 800, 805 and 810 may be any type of computing system on which the methods and systems described herein may operate. Network 815 may be any type of communication network through which computers can communicate. This includes, but is not limited to, local area networks, such as Ethernet or Token ring networks, and wide area networks, such as the Internet. Server 820 is any type of computational server capable of storing code and data that can be accessed by other computer systems over network 815 and perform accounting and account reconciliation functionality.

Server 820 includes a data storage medium for storing shared data. In one embodiment, this takes the form of a plurality of magnetic disk drives. Server 820 also includes an accounting database 825, which is any type of database system that permits storage and manipulation of accounting information. The server also preferably includes one or more processors, along with a memory, which may be part of the data storage medium that contains instructions for the one or more processors to operate. The instructions preferably include instructions to perform the account reconciliation functions and methods described herein.

FIG. 8 illustrates a system with three computers 800, 805 and 810 coupled to server 820 on which the accounting information and the accounting reconciliation functions and methods operate. However, the processes and systems described herein are applicable to systems including any number of computers. Alternatively, the processes and systems described herein may operate in a stand-alone computer system, such as a workstation, a personal computer, or a mainframe computer, or be spread over one or more of the computers of the network.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method of facilitating reconciliation of entries in a computerized accounting system, comprising:
    comparing a plurality of first entry types with a plurality of second entry types to determine whether a match exists, wherein a set of first entry types of the plurality of first entry types matches a set of second entry types of the plurality of second entry types based upon the comparison, wherein the set of first entry types comprises two or more first entry types;
    identifying one or more non-matched second entry types of the plurality of second entry types based upon the comparison;
    for each of the set of one or more first entry types that match the set of second entry types, reconciling matched entry types by determining whether a sum of the set of first entry types is equal to a sum of the set of second entry types, and identifying one or more un-reconciled first entry types of the set of first entry types having a sum that is not equal to the sum of the set of second entry types, wherein sums are determined by summing a value of an attribute of each entry type in a set;
    determining whether any second entry type of the non-matched second entry types matches the one or more un-reconciled first entry types based upon an additional comparison, wherein the additional comparison includes determining if the amount of the second entry type of the non-matched second entry types is equal to a difference of the sum of the set of first entry types and the sum of the set of second entry types;
    displaying any non-matched first entry types;
    generating a link to further information about any non-matched first entry type; and
    providing a discrepancy acceptance interface that allows a user to accept at least one of the non-matched first entry types being displayed.

2. The method of claim 1 further comprising, receiving a user input specifying a time-period and selecting the plurality of first entry types and the second entry types for comparison based upon whether the first entry types and the second entry types have an associated date that is within the specified time-period.

3. The method of claim 1 wherein comparing the plurality of first entry types and second entry types comprises comparing only the un-reconciled first entry types.

4. The method of claim 1 wherein each first entry type of the plurality of first entry types is derived from one of a receipt or a voucher and each second entry type of the plurality of second entry types is derived from the other of the receipt or voucher.

5. The method of claim 1 wherein each first entry type of the plurality of first entry types is derived from a line entry of a receipt or voucher and each second entry type of the plurality of second entry types is derived from a line entry of the other of the receipt or voucher.

6. The method of claim 1, wherein comparing the plurality of first entry types comprises comparing the plurality of first entry types and the plurality of second entry types based upon at least one key.

7. The method of claim 6 wherein the at least one key comprises four keys that include the business unit, receiver identification, receiver number, and receiver shipping sequence identification.

8. The method of claim 1 further comprising displaying a link to further information about each of the first entry types being displayed.

9. The method of claim 1 further comprising displaying each of the un-reconciled first entry types.

10. The method of claim 9 further comprising displaying a link to further information about each of the un-reconciled first entry types being displayed.

11. The method of claim 9 further comprising displaying each second entry type of the set of second entry types that does not have a sum equal to the set of first entry types.

12. The method of claim 9, further comprising providing a discrepancy accepted interface that allows a user to accept one or more of the un-reconciled first entry types that do not have a sum equal to the one or more second entry types, wherein an un-reconciled first entry type that is accepted is either prevented from further displaying or identified as explained.

13. The method of claim 1, wherein the farther information is viewed before the at least one of the non-matched first entry types being displayed is accepted by the user.

14. The method of claim 1, wherein the discrepancy accepted interface is displayed as a check box.

15. A computerized accounting system, comprising:
    a memory storing a plurality of first entry types and a plurality of second entry types; and
    a processor coupled with the memory, the processor comparing at least some of the plurality of first entry types with at least some of the second entry types to determine whether a match exists, wherein a set of first entry types of the plurality of first entry types matches a set of second entry types of the plurality of second entry types based upon the comparison, wherein the set of first entry types comprises two or more first entry types, identifying one or more non-matched second entry types of the plurality of second entry types based upon the comparison, and for each of the set of first entry types that match the set of second entry types, reconciling matched entry types by determining whether a sum of the set of first entry types that match the set of second entry types are equal to a sum of the one or more second entry types, wherein sums are determined by summing a value of an attribute of each entry type in a set, determining whether any second entry type of the non-matched second entry types matches the one or more un-reconciled first entry types based upon an additional comparison, wherein the additional comparison includes determining if the amount of the second entry type of the non-matched second entry types is equal to a difference of the sum of the set of first entry types and the sum of the set of second entry types, wherein the processor generates a link to farther information about any non-matched first entry types, wherein the processor provides a discrepancy acceptance interface that allows a user to accept at least one of the non-matched first entry type.

16. The computerized accounting system of claim 15 wherein the processor generates at least one set including the one or more first entry types that match the one or more second entry types.

17. The computerized accounting system of claim 15 wherein the processor determines which of the non-matched second entry types may match any of the non-matched first entry types.

18. The computerized accounting system of claim 15 further comprising a display to display any of the non-matched first entry types.

19. The computerized accounting system of claim 18 wherein the display is coupled with the processor through a network.

20. The computerized accounting system of claim 18 wherein the network is selected from a set consisting of a local area network or a wide area network.

21. The computerized accounting system of claim 18 wherein the memory comprises a data storage.

22. The computerized accounting system of claim 21 wherein the data storage is coupled with the processor through a network.

23. The computerized accounting system of claim 15 wherein the first entry type is derived from one of a receipt or voucher and wherein the second entry type is derived from the other of a receipt or voucher.

24. The computerized accounting system of claim 15, wherein the further information is viewed before the at least one of the non-matched first entry types being displayed is accepted by the user.

25. A computer-readable medium comprising computer readable instructions for causing a computer to perform account reconciliation in a computerized accounting system, the instructions comprising:

comparing a plurality of first entry types with a plurality of second entry types to determine whether a match exists, wherein a set of first entry types of the plurality of first entry types matches a set of second entry types of the plurality of second entry types based upon the comparison, wherein the set of first entry types comprises two or more first entry types;

identifying one or more non-matched second entry types of the plurality of second entry types based upon the comparison;

for each of the set of first entry types that match the set of second entry types, reconciling matched entry types by determining whether a sum of the set of first entry types is equal to a sum of the set of second entry types, and identifying one or more un-reconciled first entry types of the set of first entry types having a sum that is not equal to the sum of the set of second entry types;

determining whether any second entry type of the non-matched second entry types matches the one or more un-reconciled first entry types based upon an additional comparison, wherein the additional comparison includes determining if the amount of the second entry type of the non-matched second entry types is equal to a difference of the sum of the set of first entry types and the sum of the set of second entry types, wherein sums are determined by summing a value of an attribute of each entry type in a set;

generating a link to further information about any non-matched first entry type; and providing a discrepancy acceptance interface that allows a user to accept at least one of the non-matched first entry types being displayed.

* * * * *

UNITED STATES PATENT AND TRADEMARK OFFICE
CERTIFICATE OF CORRECTION

| | | |
|---|---|---|
| PATENT NO. | : 7,539,634 B2 | Page 1 of 1 |
| APPLICATION NO. | : 10/185893 | |
| DATED | : May 26, 2009 | |
| INVENTOR(S) | : Goodbody et al. | |

It is certified that error appears in the above-identified patent and that said Letters Patent is hereby corrected as shown below:

On cover sheet, under "Other Publications, lines 8-9, delete "Anonymous, Information found on the website of CheckFree, Apr. 17, 2000, pp. 11.*".

In column 1, line 12, delete "modem" and insert -- modern --, therefor.

In column 5, line 64, delete "be," and insert -- be --, therefor.

In column 7, line 63, delete "match," and insert -- match --, therefor.

In column 9, line 42, in claim 1, after "set of" delete "one or more".

In column 10, line 43, in claim 13, delete "farther" and insert -- further --, therefor.

In column 11, line 10, in claim 15, delete "farther" and insert -- further --, therefor.

In column 11, line 31, in claim 20, delete "set" and insert -- group --, therefor.

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,539,634 B2 | Page 1 of 1 |
| APPLICATION NO. | : 10/185893 | |
| DATED | : May 26, 2009 | |
| INVENTOR(S) | : Goodbody et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 860 days.

Signed and Sealed this

Fifth Day of October, 2010

David J. Kappos
*Director of the United States Patent and Trademark Office*